Patented Oct. 23, 1951

2,572,510

UNITED STATES PATENT OFFICE 2,572,510

PROCESS FOR THE MANUFACTURE OF ARTIFICIAL PORPHYRY OR ARTIFICIAL GRANITE AND THE PRODUCT THEREOF

Ivan Orsini, Cairo, Egypt

No Drawing. Application January 21, 1948, Serial No. 3,548. In Great Britain March 7, 1944

Section 1, Public Law 690, August 8, 1946
Patent expires March 7, 1964

3 Claims. (Cl. 25—155)

1

This invention relates to the production of tiles or moulded blocks consisting of a cementitious aggregate having the appearance and properties of porphyry or artificial granite.

According to the invention, cementitious granules of at least two different colours are separately prepared, mixed together without crushing the granules, and moulded cold under pressure, the moulded products being allowed to harden after removal from the mould.

The granules of each colour are preferably made from a mixture of Portland cement or white cement, or both, with powdered white marble or a coloured filling powder, or both, with or without an admixture of other filling powders.

The object of the invention is to produce artificially, inexpensively and without heating, a material resembling natural porphyry as closely as possible, both in appearance and in its physical, chemical and mechanical properties. This material may serve numerous purposes, but is more particularly intended for use in the form of paving and wall-facing tiles, decorative lining panels for building purposes, etc. excellent results being obtained owing to its great resistance to wear, shock and absorption, to its very great variety of shades, and to its brilliant appearance. Thanks to its cheapness, therefore, it may be substituted for vitrified ceramic tiles, or for natural marble, prophyry or granite lining blocks.

This material consists of a cement mortar and a filling powder. This filling powder has the following properties:

(1) It increases the power of cohesion;
(2) It increases the imperviousness of the mortar after hardening;
(3) It reduces its liability to expansion and contraction; and
(4) Some filling powders, such as powdered clay brick, kaolin powder or finely ground porcelain rubble, protect the cement against attack by acids.

Two classes of filling powder are to be distinguished:

A. Active powders, which give at least some industrial advantages to the manufacture of the material, for instance by diffusing the colour oxide, or absorbing expansions without affecting the final strength of the product: coarse grains of quartz sand or silicious sand, crushed terra cotta, powder of compact silicious limestone: and B. Powders with disintegrating properties: fine raw sand, sodium chloride, earths produced from the rubble of brickyards, etc.

2

The process of manufacture for the production of a grey porphyry is as follows:

Portland cement is intimately mixed with compact finely ground limestone, this mixture being shifted through a screen of at least 900 meshes to the sq. cm. The sifted powders are then mixed with from 30 to 40 per cent. of their volume of water with the object of making the capillary cohesion of the particles as close as possible, and thus giving a perfectly uniform paste. In this way lumps are formed, which are exposed to the air on a clean surface in order to eliminate the superfluous water contained in them. About one-third of the water is lost after 40 minutes' drying. The lumps of moist paste or mortar are then forced through a steel-wire screen having square meshes measuring from 4 to 8 millimetres between the axes of the wires. The amount of moisture in this mortar must be a maximum, but it must at the same time enable it to pass through the mesh. In this way small grains of grey mortar are obtained, of a diameter proportionate to the size of the mesh.

Parallel to this operation, white grains are prepared by the same process, but using good hydraulic lime (known commercially as "white cement") in the place of the Portland cement, the same amount of water being employed.

The grey and white granules are then thoroughly mixed in a proportion varying according to the shade eventually required, care being taken to keep the grains whole. This homogeneous mottled moist mortar mixture is then moulded in steel moulds and compressed under a minimum pressure of 250 kg. per sq. cm., for example, in the case of paving tiles.

The chemical action of the cement (the attack on the silica by the lime) starts immediately on the mixture with water. As, however, the spongy grains are sent into the mould and subjected to high pressure before entirely losing their water, the material loses nothing of its final resistance. Concrete, when prepared at works on a large scale, takes sometimes over half an hour to reach the shutterings from the mixer, nevertheless it loses nothing of its resistance.

After being removed from the moulds the tiles are kept for several days for hardening in a room shaded from bright light and draughts, in pools of water at a temperature not lower than 25° centigrade.

There then follows the process of "gritting," which consists in the removal of a thin layer from the upper surface of the tile, varying between 0.4 and 1 mm., consisting of 3 separate layers:

(a) The stratum of lime, silica, etc. brought to the surface by the hardening of the mortar;
(b) The stratum of foreign dust adhering to it;
(c) The stratum of fine powder formed from the attrition of the granules deposited at the bottom of the mould.

The tiles are finally polished by machinery before being put on the market. Apart from their greater brilliancy they resemble grey ceramic tiles, particularly as regards their edges, which are as sharp as porcelain.

This process renders it possible to imitate artificially porphyry or granite of all shades and varieties. All that is required is to mix coloured oxides (off iron, chromium, etc.) in certain proportions with Portland cement or white cement simultaneously with the mixing of the cement with the filling powder. In this way a very great variety of textures of the grains is obtained, according to the proportionate blending of the various mortars, their composition, and the size of mesh of the screens used. Portland cement and white cement mixed with metallic oxides for colouring may be replaced by the coloured cements normally on the market for some years past. I give below, by way of example, the proportions of the mixtures for the production of various colours and forms of granulation. These proportions may be taken to be by volume, though since they are obviously only approximate, and the substances employed are all of about the same specific gravity, the same proportions by weight would yield similar results.

Light grey 1 volume (grey granules):
  3 parts of Portland cement
  2 parts of compact grey limestone powder
Against 2 volumes (white granules):
  1 part of white cement
  1 part of Portland cement
  1 part of powdered white marble

Pale yellow 2 volumes (yellow granules):
  1 part of Portland cement
  1 part of white cement
  1 part of powdered white marble
  12% of powdered yellow iron oxide
Against 1 volume (white granules):
  2 parts of white cement
  1 part of powdered white marble

Grey-red 2 volumes (red granules):
  2 parts of Portland cement
  1 part of crushed terra cotta
  8% of red iron oxide
Against 3 volumes (grey granules):
  2 parts of Portland cement
  3 parts of powdered white marble

White-yellow-green 2 volumes (yellow granules):
  1 part of Portland cement
  1 part of white cement
  1 part of powdered white marble
  12% of yellow iron oxide
Against 2 volumes (green granules):
  1 part of Portland cement
  1 part of white cement
  1 part of powdered white marble
  8% of green chromium oxide And against 1 volume (white granules):
  2 parts of white cement
  1 part of powdered white marble.

It is to be understood that these cements and powders undergo the same cycle of operations as has been described above for the manufacture of grey porphyry, as regards the sifting through a sieve of 900 meshes per sq. cm.: kneading with water, the preparation of the granules etc.: and these combinations of shades can be multiplied indefinitely.

This material is very compact, and its specific gravity is 2.2.

I claim:

1. The process of forming an artificial tile having the mottled appearance and substantially equivalent physical characteristics of artificial granite, porphyry and the like comprising hydrating a finely powdered mass of white hydraulic lime intimately mixed with an inert filler powder with an excess of water, separately hydrating a finely powdered contrastingly colored Portland cement homogeneously mixed with a filler powder with an excess of water to separately form pastes of both cementitious bodies, allowing said pastes to partially hydrate with a substantial portion of the water whereby the pastes are reduced to a slightly moist condition, separately breaking the stiffened pastes into lumps and separately extruding said lumps through screens to form granules 4-8 mm. in diameter to separately produce homogeneous but contrastingly colored granular bodies, then mixing said separate granular bodies to homogeneously desirable contrastingly colored granules into a single mottled appearing moist cementitious mass without abrasively destroying the granular character thereof, pressing the granular mix in a mold at a pressure exceeding 250 kg. per sq. cm. to produce a finely set and non-porous cementitious molding, withdrawing the molded product from the mold and aging the same in water to complete the hydration and age the same to ultimate hardness and finely grinding and polishing at least one surface of said molded cementitious product to develop the mottled natural stone appearance.

2. Artificial molded and hydrated cementitious product having the high physical strength and mottled appearance of natural granite, porphyry and the like, consisting of a hydraulically set coherent mass comprising homogeneous granules of hydraulic lime and homogeneous granules of contrastingly colored Portland cement.

3. Cementitious product as defined in claim 2, wherein the contrasting color is obtained by a finely powdered colored mineral filler homogeneously embedded in one of the powdered cements prior to hydration.

IVAN ORSINI.

REFERENCES CITED

The following references are of record in the file of this patent:

UNITED STATES PATENTS

| Number | Name | Date |
| --- | --- | --- |
| 1,042,113 | Hartung | Oct. 22, 1912 |
| 1,627,296 | Slosser | May 3, 1927 |
| 2,085,640 | Czajko | June 29, 1937 |

FOREIGN PATENTS

| Number | Country | Date |
| --- | --- | --- |
| 2,011 | Great Britain | Aug. 13, 1903 |